US008231217B2

(12) United States Patent
Ballet et al.

(10) Patent No.: US 8,231,217 B2
(45) Date of Patent: *Jul. 31, 2012

(54) PIXELLIZED TRANSPARENT OPTICAL COMPONENT COMPRISING AN ABSORBING COATING, PRODUCTION METHOD THEREOF AND USE THEREOF IN AN OPTICAL ELEMENT

(75) Inventors: Jerome Ballet, Charenton le Pont (FR); Jean-Paul Cano, Charenton le Pont (FR)

(73) Assignee: Essilor International (Compagnie Generale d'optique), Charenton le Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/996,091

(22) PCT Filed: Jul. 13, 2006

(86) PCT No.: PCT/FR2006/001728
§ 371 (c)(1),
(2), (4) Date: Jan. 18, 2008

(87) PCT Pub. No.: WO2007/010125
PCT Pub. Date: Jan. 25, 2007

(65) Prior Publication Data
US 2008/0212017 A1    Sep. 4, 2008

(30) Foreign Application Priority Data

Jul. 20, 2005  (FR) ...................... 05 07720

(51) Int. Cl.
*G02C 7/00* (2006.01)
*G02C 7/02* (2006.01)
*G02C 7/04* (2006.01)
*G02C 7/10* (2006.01)
*A61F 2/14* (2006.01)

(52) U.S. Cl. ......... 351/159.65; 351/159.01; 351/159.02; 351/159.24; 351/159.61; 351/159.62; 351/159.73; 351/159.74; 351/159.75; 623/4.1

(58) Field of Classification Search ............. 351/159, 351/41, 163, 165–167, 159.75, 159.73, 159.41, 351/159.49, 159.6, 159.62, 159.63, 159.65, 351/159.01, 159.02, 159.05–159.07; 359/618–622, 359/294–296, 290, 237; 264/1.7, 2.7; 349/13
See application file for complete search history.

(56) References Cited

U.S. PATENT DOCUMENTS
2,196,066 A     4/1940   Feinbloom
(Continued)

FOREIGN PATENT DOCUMENTS
AU           779628       2/2005
(Continued)

OTHER PUBLICATIONS

Lide, David R. CRC Handbook of Chemistry and Physics, 89th Edition (CRC Handbook of Chemistry & Physics). Null: CRC, 2008 pp. 10-12 through 10-13.*

(Continued)

*Primary Examiner* — Ricky Mack
*Assistant Examiner* — Zachary Wilkes
(74) *Attorney, Agent, or Firm* — Occhiuti Rohlicek & Tsao LLP

(57) ABSTRACT

A transparent optical component (10) comprises at least one transparent set of cells (15) juxtaposed parallel to a surface of the component, each cell being separated by walls (18) parallel to the component surface, hermetically sealed and containing at least one substance having an optical property, and at least one absorbing coating (30), placed on the walls on one side extending parallel to said component surface.

The optical component can be cut out along a predefined contour and optionally drilled. The invention also comprises a method for producing such optical component and its use for producing an optical element. The optical element may be a spectacle lens in particular.

39 Claims, 2 Drawing Sheets

U.S. PATENT DOCUMENTS

| | | | |
|---|---|---|---|
| 2,511,329 A | 6/1950 | Craig | |
| 3,460,960 A * | 8/1969 | Francel et al. | 351/163 |
| 3,532,038 A * | 10/1970 | Rottmann | 359/619 |
| 3,628,854 A | 12/1971 | Jampolsky | |
| 3,978,580 A | 9/1976 | Leupp et al. | |
| 4,150,878 A | 4/1979 | Barzilai et al. | |
| 4,268,132 A | 5/1981 | Neefe | |
| 4,601,545 A | 7/1986 | Kern | |
| 4,621,912 A | 11/1986 | Meyer | |
| 4,720,173 A | 1/1988 | Okada et al. | |
| 4,791,417 A | 12/1988 | Bobak | |
| 4,994,664 A | 2/1991 | Veldkamp | |
| 5,017,000 A * | 5/1991 | Cohen | 351/159 |
| 5,044,742 A | 9/1991 | Cohen | |
| 5,067,795 A * | 11/1991 | Senatore | 349/14 |
| 5,139,707 A | 8/1992 | Guglielmetti et al. | |
| 5,233,038 A | 8/1993 | Guglielmetti et al. | |
| 5,359,444 A | 10/1994 | Piosenka et al. | |
| 5,529,725 A | 6/1996 | Guglielmetti et al. | |
| 5,576,870 A | 11/1996 | Ohmae et al. | |
| 5,585,968 A | 12/1996 | Guhman | |
| 5,604,280 A | 2/1997 | Pozzo et al. | |
| 5,699,142 A | 12/1997 | Lee et al. | |
| 5,733,077 A | 3/1998 | MacIntosh | |
| 5,763,054 A | 6/1998 | Samec et al. | |
| 5,764,333 A | 6/1998 | Somsel | |
| 5,774,273 A | 6/1998 | Bornhorst | |
| 5,805,263 A * | 9/1998 | Reymondet et al. | 351/159 |
| 5,807,906 A | 9/1998 | Bonvallot et al. | |
| 5,812,235 A | 9/1998 | Seidner et al. | |
| 5,905,561 A | 5/1999 | Lee et al. | |
| 5,914,802 A | 6/1999 | Stappaerts et al. | |
| 6,019,914 A | 2/2000 | Lokshin et al. | |
| 6,118,510 A | 9/2000 | Bradshaw et al. | |
| 6,199,986 B1 | 3/2001 | Williams et al. | |
| 6,259,501 B1 | 7/2001 | Yaniv | |
| 6,274,288 B1 | 8/2001 | Kewitsch et al. | |
| 6,281,366 B1 | 8/2001 | Frigoli et al. | |
| 6,301,051 B1 | 10/2001 | Sankur | |
| 6,307,243 B1 | 10/2001 | Rhodes | |
| 6,309,803 B1 | 10/2001 | Coudray et al. | |
| 6,327,072 B1 | 12/2001 | Comiskey et al. | |
| 6,449,099 B2 * | 9/2002 | Fujimoto et al. | 359/619 |
| 6,485,599 B1 | 11/2002 | Glowina et al. | |
| 6,577,434 B2 | 6/2003 | Hamada | |
| 6,597,340 B1 | 7/2003 | Kawai | |
| 6,707,516 B1 | 3/2004 | Johnson et al. | |
| 6,712,466 B2 | 3/2004 | Dreher | |
| 6,871,951 B2 | 3/2005 | Blum et al. | |
| 6,934,088 B2 | 8/2005 | Lai et al. | |
| 6,963,435 B2 * | 11/2005 | Mallya et al. | 359/238 |
| 6,987,605 B2 | 1/2006 | Liang et al. | |
| 7,036,929 B1 | 5/2006 | Harvey | |
| 7,144,529 B1 | 12/2006 | Mercier | |
| 7,227,692 B2 | 6/2007 | Li et al. | |
| 7,289,260 B2 | 10/2007 | Kaufman et al. | |
| 7,404,637 B2 | 7/2008 | Miller et al. | |
| 7,533,453 B2 | 5/2009 | Yancy | |
| 7,715,107 B2 | 5/2010 | Loopstra et al. | |
| 2002/0008898 A1 | 1/2002 | Katase | |
| 2002/0016629 A1 | 2/2002 | Sandstedt et al. | |
| 2002/0080464 A1 | 6/2002 | Bruns | |
| 2002/0114054 A1 | 8/2002 | Rietjens | |
| 2002/0140899 A1 | 10/2002 | Blum et al. | |
| 2002/0145797 A1 | 10/2002 | Sales et al. | |
| 2002/0167638 A1 | 11/2002 | Byun et al. | |
| 2002/0176963 A1 | 11/2002 | Chen et al. | |
| 2003/0003295 A1 | 1/2003 | Dreher | |
| 2003/0021005 A1 | 1/2003 | Liang et al. | |
| 2003/0035199 A1 | 2/2003 | Liang et al. | |
| 2003/0081172 A1 | 5/2003 | Dreher | |
| 2003/0085906 A1 | 5/2003 | Elliott et al. | |
| 2003/0143391 A1 | 7/2003 | Lai | |
| 2003/0147046 A1 | 8/2003 | Shadduck | |
| 2003/0152849 A1 | 8/2003 | Chan-Park et al. | |
| 2003/0174385 A1 | 9/2003 | Liang et al. | |
| 2003/0206260 A1 | 11/2003 | Kobayashi et al. | |
| 2004/0008319 A1 | 1/2004 | Lai et al. | |
| 2004/0027327 A1 | 2/2004 | LeCain et al. | |
| 2004/0051833 A1 | 3/2004 | Hain et al. | |
| 2004/0114111 A1 | 6/2004 | Watanabe | |
| 2004/0120667 A1 | 6/2004 | Aylward et al. | |
| 2004/0125247 A1 | 7/2004 | Seshan et al. | |
| 2004/0125337 A1 | 7/2004 | Boulineau et al. | |
| 2004/0165252 A1 | 8/2004 | Liang et al. | |
| 2004/0169932 A1 | 9/2004 | Esch et al. | |
| 2004/0190115 A1 | 9/2004 | Liang et al. | |
| 2004/0233381 A1 * | 11/2004 | Kim et al. | 351/110 |
| 2006/0006336 A1 | 1/2006 | Cano et al. | |
| 2006/0087614 A1 | 4/2006 | Shadduck | |
| 2006/0279848 A1 | 12/2006 | Kuiper et al. | |
| 2007/0152560 A1 | 7/2007 | Naito et al. | |
| 2008/0068723 A1 | 3/2008 | Jethmalani et al. | |
| 2008/0212018 A1 | 9/2008 | Ballet et al. | |
| 2008/0314499 A1 | 12/2008 | Begon et al. | |

FOREIGN PATENT DOCUMENTS

| | | |
|---|---|---|
| CA | 2340672 | 12/2000 |
| DE | 19714434 | 10/1998 |
| EP | 728572 | 8/1996 |
| EP | 1225458 | 7/2002 |
| EP | 1308770 | 5/2003 |
| FR | 2561005 | 9/1985 |
| FR | 2718447 | 10/1995 |
| FR | 2872589 | 1/2006 |
| JP | 61-140920 | 6/1986 |
| JP | 61-177428 | 8/1986 |
| JP | 05-027214 | 2/1993 |
| JP | 11-142806 | 5/1999 |
| JP | 11-352453 | 12/1999 |
| JP | 2003-504665 | 2/2003 |
| JP | 2004-527785 | 9/2004 |
| JP | 2005-128518 | 5/2005 |
| WO | 00/77570 | 12/2000 |
| WO | 01/02895 | 1/2001 |
| WO | 02/01281 | 1/2002 |
| WO | 02/065215 | 8/2002 |
| WO | 03/012542 | 2/2003 |
| WO | 03/077012 | 9/2003 |
| WO | 03/102673 | 12/2003 |
| WO | 2004/015481 | 2/2004 |
| WO | 2004/034095 | 4/2004 |
| WO | 2004/051354 | 6/2004 |
| WO | 2005/033782 | 4/2005 |
| WO | 2006/013250 | 2/2006 |
| WO | 2006/050366 | 5/2006 |
| WO | 2006/067309 | 6/2006 |
| WO | 2007/010414 | 1/2007 |
| WO | 2007/023383 | 3/2007 |
| WO | 2007/144308 | 12/2007 |

OTHER PUBLICATIONS

Cognard, Philippe. "Colles et adhesifs pour emballages, Generalities," 18 pages (English Summary Provided), Nov. 10, 2001.
Fowles, Grant R. Introduction to Modern Optics. New York: Dover Publications, 1989. Print. pp. 138-139.
Hecht, Eugene, "Optics, $4^{th}$ Edition" 2002 Addison Wesley, p. 428 (XP002465206) (chapter 10 from $2^{nd}$ edition provided).
J-P. Perez, Optique: Fondements et Applications [Optics: Basics and Applications] $7^{th}$ edition, published by Dunod, Oct. 2004, p. 262.
Kaufman U.S. Appl. No. 60/507,940 Drawing Sheets 4, 5.

* cited by examiner

PIXELLIZED TRANSPARENT OPTICAL COMPONENT COMPRISING AN ABSORBING COATING, PRODUCTION METHOD THEREOF AND USE THEREOF IN AN OPTICAL ELEMENT

CROSS-REFERENCE TO RELATED APPLICATIONS

This application is the National Stage of International Application No. PCT/FR2006/001728, filed on Jul. 13, 2006, which claims the priority of French Application No. 0507720, filed on Jul. 20, 2005. The contents of both applications are hereby incorporated by reference in their entirety.

The present invention relates to the production of transparent elements incorporating optical functions. It applies particularly to the production of ophthalmic lenses having various optical properties.

Ametropia correcting lenses are conventionally produced by forming a transparent material with refractive index higher than air. The shape of the lenses is selected so that the refraction at the interfaces between the material and the air causes appropriate focusing of the light on the wearer's retina. The lens is generally cut out to be fitted into a frame, with an appropriate positioning with respect to the pupil of the corrected eye.

Among the various types of lenses, or others not necessarily limited to ophthalmic optics, it would be desirable to propose a structure for implementing one or more optical functions in a flexible and modular manner, while preserving the possibility of cutting out the optical element obtained to incorporate it in a frame imposed or selected elsewhere, or in any other means for securing said optical element.

It is an object of the present invention to meet this need. A further object is to ensure that the optical element is suitable for industrial production under satisfactory conditions.

The invention thus proposes a method for producing a transparent optical element, comprising the production of a transparent optical component having at least:

one set of cells juxtaposed parallel to a surface of the component, each cell being hermetically sealed and containing a substance having an optical property, the cells being separated by walls;

and at least one absorbing coating, placed on the walls on one side extending parallel to said component surface.

The invention also proposes a method for producing a transparent optical element as defined above further comprising a step of cutting out the optical component along a contour defined on said surface, corresponding to a predefined shape for the optical element.

The cells can be filled with various substances selected for their optical properties, for example associated with their refractive index, their light absorption or polarization capacity, their response to electrical or light stimuli, etc.

Hence the structure lends itself to numerous applications, particularly those making use of evolved optical functions. It implies a discretization by pixels of the surface of the optical element, offering great flexibility in design and also in the processing of the element. Each pixel comprises a cell bounded by walls. The structure thus comprises a cell network bounded by walls and at least one absorbing coating, said coating being pixellized identically to the cell network. This absorbing coating, deposited in parallel to the surface of the optical component, and matching the geometry of the cell network, has the essential role of preventing the light from propagating through each of the component walls of said network. This absorbing coating may also, in another embodiment, have a width different from the strict width of the walls making up the cell network. It is easy to understand that said absorbing coating represents a discontinuous coating and that the absorbing material(s) is (are) only present at the level of the surface occupied by the component walls of the cell network with a width identical to or different from those of said walls.

It is possible to produce structures pixellized by discretization which consist of a succession of adjacent cells in the plane, separated by walls. These walls are the cause of a transparency defect of the optical component and they can accordingly cause a transparency defect of the optical element comprising such a component.

In the context of the invention, it is understood that an optical component is transparent when the observation of an image through said optical component is perceived without a significant loss of contrast, that is when the formation of an image through said optical component is obtained without reducing the image quality. This definition of the term transparent is applicable, in the context of the invention, to all the objects qualified as such in the description.

The walls separating the cells of the optical component interact with the light by diffracting it. Diffraction is defined as the scattering of light observed when a light wave is materially limited (J-P. Perez—Optique, Fondements et applications $7^{th}$ edition—Dunod—October 2004, p. 262). Thus an optical component comprising such walls transmits a degraded image due to the diffraction induced by said walls. Microscopic diffraction appears macroscopically as scattering. This macroscopic or incoherent scattering results in a diffusing halo of the pixellized structure of the optical component and hence in a loss of contrast of the image observed through said structure. This loss of contrast can be considered as a loss of transparency, as defined above. This macroscopic scattering effect is unacceptable for producing an optical element comprising a pixellized optical component as understood in the context of the invention. This is particularly true when said optical element is an ophthalmic lens, which must on the one hand be transparent and on the other comprise no cosmetic defect that could hinder the view of the wearer of such an optical element.

One means of attenuating this macroscopic scattering consists in reducing the diffraction induced by the walls by preventing the light from propagating in said walls separating the cells. This is because the part of the light which is absorbed or reflected is not diffracted. Thus a wall for which the interaction with light is limited will diffract less than a wall allowing light to propagate. If we now consider a set of walls, the decrease in diffraction caused by each of the walls causes the reduction of the overall scattering aspect at the macroscopic level.

It is therefore one object of the present invention to produce a transparent optical component comprising a set of cells juxtaposed parallel to the surface of a substrate in which the cells are separated from one another by walls, and at least one absorbing coating, said coating being deposited parallel to the surface of said walls, and according to the geometry of the network bounded by the walls. In such optical component, said absorbing coating absorbs all or part of the light reaching the walls, thereby avoiding macroscopic scattering through the wall network, and accordingly enables to produce a transparent optical element comprising an optical component as described.

In the context of the invention, absorbing coating means here a coating comprising one or more materials which absorb in all or part of the visible spectrum, that is, which have at least one wavelength absorption band of between 400 nm and 700 nm. Advantageously according to the invention, a coating is preferably selected having an absorption band over the whole visible spectrum. The material(s) used for producing the coating may optionally comprise a spectral absorption band in the near infrared, that is above 700 nm and/or in the near ultraviolet, that is below 400 nm.

The absorbing coating is selected from a monolayer or multilayer coating. In the case of the monolayer coating, it may consist of a single absorbing material or may consist of a combination of at least two materials, each having an identical or different absorption band in the visible spectrum. It is, for example, possible to use two materials having complementary absorption bands in order to obtain a coating absorbing over the whole visible spectrum as defined above. In the case of a multilayer coating, each layer may consist of an identical or different material, both in their chemical nature and in their specific absorption band. Each layer may also consist of a mixture of a plurality of absorbing materials.

In a first embodiment of the invention, the optical component comprises at least one absorbing coating deposited parallel to the base of the wall surface. In a second embodiment, the optical component comprises at least one absorbing coating deposited parallel to the top of the wall surface.

In a third embodiment of the invention, the optical component comprises at least one absorbing coating deposited parallel to the base and to the top of the wall surface.

In these three embodiments, as stated previously, the absorbing coating has a thickness identical to or greater than the thickness of the wall on and/or under which it is deposited.

Advantageously according to the invention, the absorbing coating is deposited by a metallization process. This process can be implemented prior to the formation of said walls, or subsequent to the formation of said walls. When the metallization is carried out prior to the formation of the walls, said metallization process can be implemented directly on a rigid transparent support or in a flexible transparent film transferred later onto a rigid transparent support. In this metallization process, the absorbing coating consists of metal. The metals useable in the context of the invention are particularly aluminium, silver, chromium, titanium, platinum, nickel, copper, iron, zinc, tin, palladium and gold. Preferably, the absorbing material selected from silver, aluminium, titanium, chromium and gold.

Other materials can be used for producing the absorbing coating. As examples, mention can be made of hybrid materials such as sol-gel resins or composites such as ceramic/metal or silica/metal mixtures. Polymers intrinsically absorbing or made absorbing by doping, by diffusion or by absorption of absorbing particles may also be used in the context of the invention. A polymer comprising particles of carbon black may be an example for performing this role. A coating comprising one or more layers of carbon may also be deposited. Thus among the absorbing particles suitable for making an absorbing polymer useful for the invention, mention can be made particularly of dyes, inks, pigments, colloids, metal particles, alloys, carbon black, carbon nanotubes. These particles can easily be incorporated in polymers of the sol-gel, polyurethane, acrylate or epoxy type by methods well known to a person skilled in the art. The polymers thereby obtained have at least one absorption band of 400 nm and 700 nm, and preferably, absorb over the whole visible spectrum between 400 nm and 700 nm. They may optionally have an absorption band in the near ultraviolet or in the near infrared.

The invention thus comprises a method for producing an optical component having at least one transparent set of cells juxtaposed parallel to a surface of the component, the cells being separated by walls, comprising the following steps:

depositing a uniform absorbing coating on the whole of the surface of a rigid transparent support or of a flexible transparent film;

depositing a layer of wall-constituting transparent material(s) and producing a cell network in said layer of transparent material(s) in order to obtain said set of cells juxtaposed the parallel to said surface;

carrying out a chemical or physicochemical etching of the absorbing coating in each cell.

In an alternative of this method, it is possible to:

deposit an absorbing coating through a mask, said mask having the pattern of the cell distribution in the network to be obtained;

deposit a layer of wall-constituting transparent materials by a positive photolithographic process while aligning said layer of transparent materials with the pattern of the absorbing coating.

The implementation of such a method enables to deposit an absorbing coating directly on the rigid transparent support or the flexible transparent film; in other words, it is suitable for obtaining an optical component having at least one transparent set of cells juxtaposed parallel to a surface of the component, in which said cells are separated by walls comprising an absorbing coating in contact with the rigid transparent support or the flexible film and a layer of component transparent material(s) of said walls. In such a method, the walls are made absorbing by the presence of an absorbing coating at their base.

The cell network can be obtained by using production methods issuing from microelectronics, well known to a person skilled in the art. For illustration and in a non-limiting manner, mention can be made of methods such as hot printing, hot embossing, micromoulding, photolithography (hard, soft, positive, negative), microdeposition such as microcontact printing, screen printing, or inkjet printing.

In this embodiment, when the absorbing coating consists of one or more metal layers, the metal layer is for example etched by a RIE (Reactive Ion Etching) type of process. RIE is a physicochemical process which consists of a bombardment of the metal layer by a vertical ion beam. Several gases can be used in this process. Mention can be made for example of $CF_4$, $SF_6$, $O_2$, $CHF_3$, and Argon. This dry etching is anisotropic. The metal can also be attacked by wet etching by acidic or basic solutions.

In another embodiment, the invention comprises a method for producing an optical component having at least one transparent set of cells juxtaposed parallel to a surface of the component, the cells being separated by walls, comprising the following steps:

depositing a uniform layer of wall-constituting transparent material(s) on the whole of the surface of a rigid transparent support or of a flexible transparent film;

depositing an absorbing coating on said uniform layer of component material(s);

producing the cells by an etching process, through a mask, of said absorbing coating, and then said layer of transparent material(s) in order to obtain said set of cells juxtaposed parallel to said surface.

In such a method, the walls are made absorbing by the presence of an absorbing coating at their top; in other words, this method serves to obtain an optical component having at least one transparent set of cells juxtaposed parallel to a surface of the component, in which said cells are separated by walls comprising a layer of transparent material(s) in contact with the rigid transparent support or the flexible film, and an absorbing coating.

The absorbing coating has a height of between a few nanometers and 5 μm. Advantageously, the thickness of the coating is between 2 nm (nanometer) and 2 μm (microns).

In one alternative of the invention, the component material of the walls can itself be absorbing. In this case, the material is selected from polymers intrinsically absorbing or made absorbing by doping, diffusion, or absorption of absorbing particles.

All the walls (and consequently all the cells of the optical component) can be formed directly on a rigid transparent support, or in a flexible transparent film, then transferred onto a rigid transparent support. Said rigid transparent support may be convex, concave or planar on the side receiving the set of cells.

The geometry of the cell network is characterized by dimensional parameters which may generally be reduced to the dimensions (D) of the cells parallel to the surface of the optical component, to the height corresponding to the height (h) of the walls separating them, and to the thickness (d) of these walls (measured parallel to the component surface). Parallel to the component surface, the cells are preferably separated by walls having a thickness (d) of between 0.10 μm and 5 μm and a height (h) of less than 100 μm and preferably between 1 μm and 50 μm inclusive.

With a wall dimensioning as defined previously, it is possible to produce a set of cells juxtaposed on the surface of the optical component having a filling ratio t higher than 90%. In the context of the invention, the filling ratio is defined as the area occupied by the cells filled by the substance, per unit area of optical component. In other words, all the cells occupy at least 90% of the component surface, at least in a region of the component provided with all the cells. Advantageously, the filling ratio is between 90% and 99.5% inclusive.

In one embodiment of the method, the substance having an optical property contained in at least some of the cells is in liquid or gel form. Said substance can particularly have at least one of the optical properties selected from colouration, photochromism, polarization and refractive index.

The set of cells of the optical component may include several cell groups containing different substances. Similarly, each cell may be filled with a substance having one or more optical properties such as described previously. It is also possible to stack several sets of cells over the thickness of the component. In this embodiment, the sets of cells may have identical or different properties in each layer, or the cells in each set of cells may also have different optical properties. It is thereby possible to consider having one layer in which all the cells contain a substance for obtaining a variation in refractive index and another layer in which all the cells contain a substance having a photochromic property.

A further object of the present invention is a method for producing a transparent optical component as defined previously, which comprises forming of a wall network on a substrate to bound the cells parallel to said component surface, forming at least one absorbing coating parallel to the surface of said walls, a collective or individual filling of the cells with the substance having an optical property in liquid or gel form, and the sealing of the cells on their side opposite the substrate.

Another aspect of the invention relates to an optical component, used in the above method. This optical component comprises at least one transparent set of cells juxtaposed parallel to a surface of the component and at least one absorbing coating comprising at least one absorbing material, placed parallel to the surface of said walls, each cell being separated by walls. Each cell is hermetically sealed and contains at least one substance having an optical property.

Yet a further aspect of the invention relates to a transparent optical element, particularly a spectacle lens, produced by cutting out such an optical component. A spectacle lens comprises an ophthalmic lens. Ophthalmic lens means lenses adapted to a spectacle frame to protect the eye and/or correct the view, these lenses being selected from a focal, unifocal, bifocal, trifocal and progressive lenses. While ophthalmic optics is a preferred field of application of the invention, it can be understood that this invention is applicable to transparent optical elements of other types, such as, for example, lenses for optical instruments, filters particularly for photography or astronomy, optical sighting lenses, eyeshades, optics of lighting devices, etc. The scope of the invention includes ophthalmic lenses in ophthalmic optics, but also contact lenses and eye implants.

Other features and advantages of the present invention will appear in the description below of non-limiting embodiments, with reference to the drawings appended hereto, in which.

Figures 1, 2:
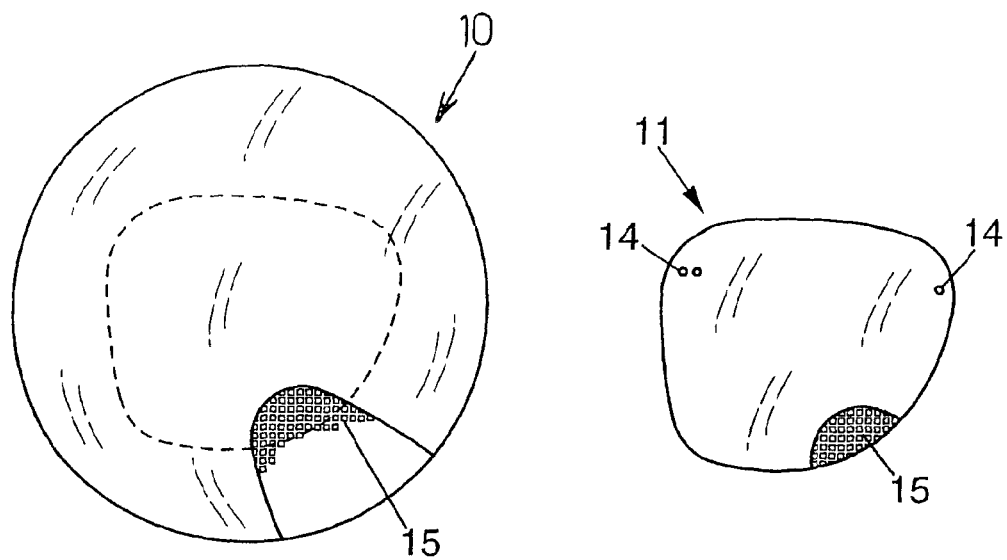
FIG. 1 is a front view of an optical component of the invention.
FIG. 2 is a front view of an optical element obtained from this optical component.

The optical component 10 shown in FIG. 1 is a blank for a spectacle lens. A spectacle lens comprises an ophthalmic lens, as defined above. Naturally, while ophthalmic optics is a preferred field of application of the invention, it can be understood that this invention is applicable to transparent optical elements of other types.

FIG. 2 shows a spectacle lens 11 obtained by cutting out the blank 10 along a predefined contour, shown by a broken line in FIG. 1. This contour is basically arbitrary, in so far as it is inscribed in the area of the blank. Mass produced blanks can therefore be used for obtaining lenses adaptable to a wide variety of spectacle frames. The edge of the cut-out lens can be trimmed without any problem, conventionally, to impart a shape adapted to the frame and to the method for fastening the lens to this frame and/or for aesthetic reasons. Holes 14 can be drilled therein, for example to receive screws for fastening the lens to the frame.

Figure 3A:
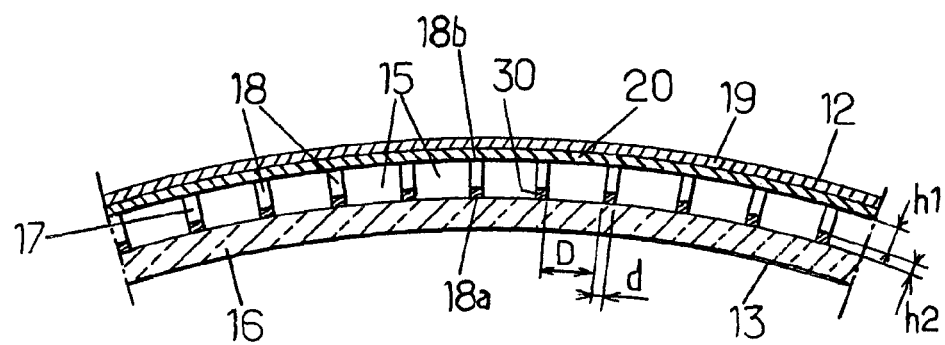
FIG. 3a shows a schematic cross section of an optical component according to a first embodiment of the invention.

The general shape of the blank 10 may conform to industrial standards, with for example a circular contour 70 mm (millimeter) in diameter, a front convex side 12, and a back concave 13 (FIG. 3a). Traditional cutting, trimming and drilling tools can thus be used to obtain the lens 11 from the blank 10.

In FIGS. 1 and 2, a partial cutaway of the surface layers reveals the pixellized structure of the blank 10 and of the lens 11. This structure consists of a network of cells or microcells 15 formed in a layer 17 of the transparent component and an absorbing coating 30 (FIG. 3a). In these figures, the dimensions of the layer 17, of the coating 30, and of the cells 15 have been exaggerated with regard to those of the blank 10 and of its substrate 16 to facilitate the reading of the drawing.

The lateral dimensions (D) of the cells 15 (parallel to the surface of the blank 10) are larger than one micron and can be as high as a few millimeters. This cell network can thereby be produced with technologies fully mastered in the field of microelectronics or micromechanical devices. The height ($h_1$) of the layer 17 constituting the walls 18 is preferably between 1 µm and 50 µm. The walls 18 have a thickness (d) of between 0.1 µm and 5.0 µm, particularly for obtaining a high filling ratio. The layer of absorbing materials 30 has a height ($h_2$) of between a few nanometers and 5 µm. It may in particular constitute an aluminium layer with a height of 1 µm.

FIG. 3*a* is a first embodiment of the invention in which the absorbing coating is deposited parallel to the substrate surface and to the base (18*a*) of the walls. In the context of the invention, base of the walls means here the side of the walls parallel to the substrate surface and located at the shortest distance from said substrate. In this particular embodiment, the thickness of the layer of absorbing materials 30 present at the base of each of the walls constituting the cell network is identical to or greater than the thickness of said walls 18. This is easily obtained by using a mask during a process of etching the absorbing coating.

Figure 3B:
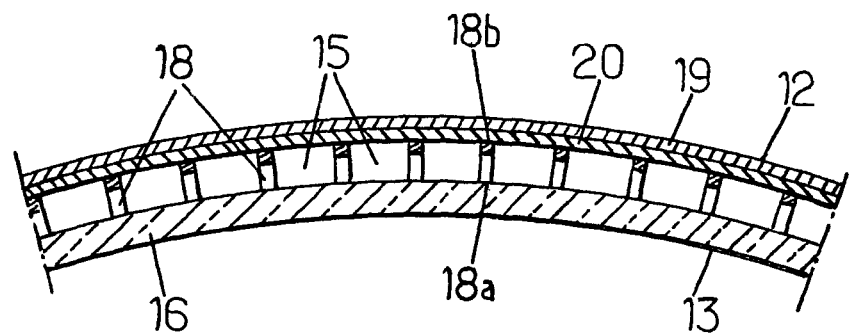
FIG. 3b shows a schematic cross section of an optical component according to a second embodiment of the invention.

FIG. 3*b* is a second embodiment of the invention in which the absorbing coating is deposited parallel to the substrate surface and to the top (18*b*) of the walls. In the context of the invention, top of the walls means here the side of the walls parallel to the substrate surface and located at the longest distance from said substrate, that is, on the side opposite the substrate.

Figure 3C:
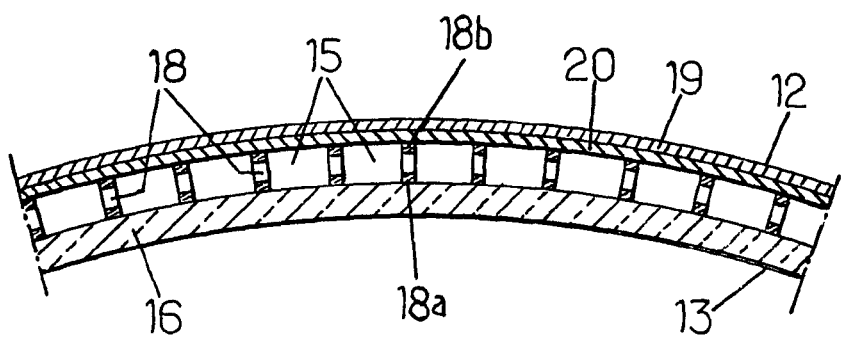
FIG. 3c shows a schematic cross section of an optical component according to a third embodiment of the invention.

FIG. 3*c* is a third embodiment of the invention in which an absorbing coating (18) is deposited parallel to the substrate surface at the base (18*a*) and at the top (18*b*) of the walls.

The layer 17 incorporating the cell network 15 can be covered with a number of additional layers 19, 20 (FIG. 3), as is common in ophthalmic optics. These layers, for example, have impact strength, scratch resistance, colouration, antiglare, anti-soiling, etc. functions. In the example shown, the layer 17 incorporating the cell network is placed immediately above the transparent substrate 16, but it may be understood that one or more intermediate layers may be found between them, such as layers having impact strength, scratch resistance, or colouration functions.

The transparent substrate 16 may be made from glass or various polymers commonly used in ophthalmic optics. Among the useable polymers, mention can be made, in a non-limiting manner, and for information, of polycarbonates; polyamides; polyimides; polysulphones; copolymers of polyethyleneterephtalate and polycarbonate; polyolefins, particularly polynorbornenes; polymers and copolymers of diethylene glycol bis(allylcarbonate); (meth)acrylic polymers and copolymers particularly (meth)acrylic polymers and copolymers derived from bisphenol-A; thio(meth)acrylic polymers and copolymers; urethane and thiourethane polymers and copolymers; epoxy polymers and copolymers; and episulphide polymers and copolymers.

The layer 17 incorporating the cell network is preferably located on the front convex side 12, the back concave side 13 remaining free to be optionally shaped by machining and polishing if necessary. The optical component may also be positioned on the concave side of a lens. Obviously, the optical component can also be integrated on a plane optical element.

The microcells 15 are filled with the substance having an optical property in the liquid or gel state. Prior treatment of the front side of the component may optionally be applied to facilitate the surface wetting of material of the walls and bottom of the microcells. The solution or suspension forming the substance having an optical property may be the same for all the microcells of the network, in which case it can be introduced simply by immersing the component in an appropriate bath, by a screen printing type of process, by a spin process, by spreading the substance using a roller or scraper, or by a spray process. It can also be injected locally into the individual microcells using a material jet unit.

To hermetically seal a set of filled microcells, an adhesive plastic film is applied for example, heat sealed or hot rolled on the top of the walls 18, or on the absorbing coating if the latter is present at the top of the walls. A solution polymerizable material can also be deposited on the zone to be sealed, the material being immiscible with the substance having an optical property present in the microcells, and the material can then be cured, for example by heat or irradiation.

Once the microcell network 15 has been completed, the component can receive the additional layers or coatings 19, 20 to complete its production. Components of this type are mass produced and stored to be retrieved later and cut out individually according to a client's requirements.

If the substance having an optical property is not intended to remain in the liquid or gel state, a solidification treatment can be applied thereto, for example a heating and/or irradiation sequence, at an appropriate stage from the time when the substance has been deposited.

In an alternative, the optical component consisting of a microcell network is constructed in the form of a flexible transparent film. Such a film can be obtained by techniques similar to those described previously. In this case, the film can be produced on a planar and non-convex or -concave support.

The film is, for example, produced industrially on a relatively large scale, then cut out to appropriate dimensions to be transferred onto the substrate 16 of a blank. This transfer can be made by bonding the flexible film, by thermoforming the film, or by a physical process of vacuum adhesion. The film can then receive various coatings, as in the previous case, or be transferred onto the substrate 16, itself coated with one or more additional layers as described above.

In one field of application of the invention, the optical property of the substance introduced into the microcells 15 is related to its refractive index. The refractive index of the substance is modulated along the surface of the component to obtain a corrective lens. In a first alternative of the invention, the modulation can be carried out by introducing substances of different refractive indexes during the production of the microcell network 15.

In another alternative of the invention, the modulation can be carried out by introducing into the microcells 15 a substance having a refractive index which can be adjusted subsequently by irradiation. The inscription of the corrective optical function is then performed by exposing the blank 10 or the lens 11 to light, with light-energy varying along the surface to obtain the desired refractive index profile in order to correct the vision of the patient. This light is typically that produced by a laser, the writing unit being similar to that used to write CD ROMs or other optical memory supports. The variation of the exposure of the photosensitive substance may result from a modulation of the laser power and/or the choice of the exposure time.

Among the substances that can be used for this application, mention can be made, for example, of mesoporous materials or liquid crystals. These liquid crystals can be fixed by a polymerization reaction, for example caused by irradiation. They can thus be fixed in a state selected to introduce a predefined optical delay in the light waves passing through. In the case of a mesoporous material, the refractive index of the material is controlled via variation of its porosity. Another possibility is to use photopolymers whereof a well known quality is to change the refractive index during the polymerization reaction caused by irradiation. These index variations are due to a modification of the density of the material and a change in its chemical structure. The photopolymers used are preferably those which only undergo a very small change in volume during the polymerization reaction.

The selective polymerization of the solution or suspension is carried out in the presence of a spatially differentiated radiation with regard to the component surface, in order to obtain the desired index modulation. This modulation is previously determined according to the estimated ametropia of the eye of a patient to be corrected.

In a further application of the invention, the substance introduced in gel or liquid form into the microcells has a polarization property. Among the substances used in this application, mention can be made particularly of liquid crystals.

In another application of the invention, the substance introduced in liquid or gel form into the microcells has a photochromic property. Among the substances used in this application, mention can be made for example of photochromic compounds containing a central core such as a spirooxazine, spiro-indoline[2,3']benzoxazine, chromene, spiroxazine homoazaadamantane, spirofluorene-(2H)-benzopyrane or naphthol[2,1-b]pyrane ring.

In the context of the invention, the substance having an optical property may be a dye, or a pigment suitable for modifying the transmission rate.

The invention claimed is:

1. Method for producing a transparent optical element selected from ophthalmic lenses, contact lenses, and eye implants, comprising the production of a transparent optical component having at least:
    one set of cells juxtaposed parallel to a surface of the component, each cell being hermetically sealed and containing a substance having an optical property, the cells being separated by walls;
    and at least one absorbing coating, placed on the walls on a side extending parallel to said component surface, the absorbing coating having at least one wavelength absorption band of between 400 nm and 700 nm,
the transparent optical component configured so that a single image of an object is obtained when the object is viewed through the whole set of cells.

2. Method for producing a transparent optical element according to claim 1, further comprising a step of cutting out the optical component along a contour defined on said surface, corresponding to a predefined shape for the optical element.

3. Method according to 1, in which the optical property is selected from colouration, photochromism, polarization and refractive index.

4. Method according to claim 3, in which the substance having an optical property contained in at least some of the cells is in liquid or gel form.

5. Method according to claim 1, in which the set of cells of the optical component is formed directly on a rigid transparent support, or within a flexible transparent film, then transferred onto a rigid transparent support.

6. Method according to claim 5, in which the rigid transparent support may be convex, concave, or planar on the side receiving the set of cells.

7. Method according to claim 1, in which the absorbing coating has an absorption band over the whole visible spectrum.

8. Method according to claim 7, in which the absorbing coating also has a spectral absorption band in at least one of the near infrared, that is above 700 nm and the near ultraviolet, that is below 400 nm.

9. Method according to claim 1, in which the absorbing coating is produced by a metallization process.

10. Method according to claim 1, in which the absorbing coating is deposited prior to the formation of said walls, or subsequent to the formation of said walls.

11. Method according to claim 1, comprising the following steps:
    depositing a uniform absorbing coating on the whole of the surface of a rigid transparent support or of a flexible transparent film;
    depositing a layer of a wall-constituting transparent material and producing the cell network within said layer of transparent material in order to obtain said set of cells juxtaposed in parallel to said surface;
    performing a chemical or physicochemical etching of the absorbing coating within each cell.

12. Method according to claim 1, comprising the following steps:
    depositing an absorbing coating through a mask, said mask having the pattern of the cell distribution in the network to be obtained;
    depositing a layer of wall-constituting transparent materials by implementing a positive photolithographic process while aligning said layer of transparent materials with respect to the pattern of the absorbing coating.

13. Method according to claim 1, comprising the following steps:
    depositing a uniform layer of wall-constituting transparent material on the whole of the surface of a rigid transparent support or of a flexible transparent film;
    depositing a metal layer on said uniform layer of wall-constituting material;
    producing the cells by implementing an etching process through the mask of said metal layer, and then said layer of transparent material in order to obtain said set of cells juxtaposed parallel to said surface.

14. Method according to claim 13, in which the metal layer is etched using a Reactive Ion Etching process.

15. Method according to claim 1, in which the cell network is obtained by implementing a method selected from hot printing, hot embossing, micromoulding, photolithography, microdeposition, screen printing, and inkjet printing.

16. Method according to claim 15, in which the wall-constituting material has an absorption over at least part of the visible spectrum.

17. Method according to claim 1, which comprises forming a wall network on a substrate to bound the cells parallel to said component surface, forming at least one absorbing coating parallel to the surface of said walls, this step occurring at least one of prior to and subsequent to the forming of said wall network, a collective or individual filling of the cells with the substance having an optical property in liquid or gel form, and sealing the cells on their side opposite the substrate.

18. Method according to claim 1, in which the absorbing coating comprises a metal selected from aluminium, silver, chromium, titanium, platinum, nickel, copper, iron, zinc, tin, palladium and gold.

19. Method according to claim 18, in which the absorbing coating comprises a metal selected from silver, aluminium, titanium, chromium and gold.

20. Method according to claim 1, in which the absorbing coating comprises an absorbing material selected from hybrid materials including sol-gel resins, composite materials including ceramic/metal or silica/metal mixtures, and carbon.

21. Method according to claim 1, in which the absorbing coating comprises an absorbing material selected from polymers intrinsically absorbing or made absorbing by doping, diffusion or absorption of absorbing particles.

22. Method according to claim 21, in which the absorbing particles are selected from dyes, inks, pigments, colloids, metal particles, alloys, carbon black, and carbon nanotubes.

23. Optical component configured to be used to produce a transparent optical element selected from ophthalmic lenses, contact lenses, and eye implants, the optical component comprising
- at least one set of transparent cells juxtaposed parallel to a surface of the component and
- at least one absorbing coating, placed on the walls on one side extending parallel to said component surface, the absorbing coating having at least one wavelength absorption band of between 400 nm and 700 nm, each cell being hermetically sealed and containing a substance having an optical property, all the cells being separated by walls, the optical component configured so that a single image of an object is obtained when the object is viewed through the whole set of cells.

24. Optical component according to claim 23, in which the absorbing coating is deposited parallel to the base of the wall surface.

25. Optical component according to claim 24, in which the absorbing coating has a thickness identical to the wall thickness or a thickness greater than the wall thickness.

26. Optical component according to claim 23, in which the absorbing coating is deposited parallel to the top of the wall surface.

27. Optical component according to claim 23, in which the absorbing coating is deposited parallel to the base and to the top of the wall surface.

28. Optical component according to claim 23, in which the absorbing coating comprises a material selected from aluminium, silver, chromium, titanium, platinum, nickel, copper, iron, zinc, tin, palladium and gold.

29. Optical component according to claim 28, in which the material is selected from silver, aluminium, titanium, chromium and gold.

30. Optical component according to claim 23, in which the absorbing coating comprises a material selected from hybrid materials including sol-gel resins, composites including ceramic/metal or silica/metal mixtures, and carbon.

31. Optical component according to claim 23, in which the absorbing coating comprises a material selected from polymers intrinsically absorbing or made absorbing by doping, diffusion or absorption of absorbing particles.

32. Optical component according to claim 31, in which the absorbing particles are selected from dyes, inks, pigments, colloids, metal particles, alloys, carbon black, and carbon nanotubes.

33. Optical component according to claim 23, in which the absorbing coating has a height of between 2 nm and 5 µm.

34. Optical component according to claim 23, in which the cells are separated by walls having a thickness of between 0.10 µm and 5 µm, and a height of between 1 µm and 50 µm inclusive.

35. Optical component according to claim 23, in which the filling ratio is between 90% and 99.5% inclusive.

36. Spectacle lens produced by cutting out an optical component according to claim 23.

37. Spectacle lens according to claim 36, in which at least one hole is drilled through the optical component to fasten the spectacle lens to a frame.

38. Method for producing a transparent optical element selected from ophthalmic lenses, contact lenses, and eye implants, comprising the production of a transparent optical component having at least:
- one set of cells juxtaposed parallel to a surface of the component, each cell being hermetically sealed and containing a substance having an optical property, the cells being separated by walls;
- and at least one absorbing coating, placed adjoining the walls on a side extending parallel to said component surface, the absorbing coating having at least one wavelength absorption band of between 400 nm and 700 nm, the transparent optical component configured so that a single image of an object is obtained when the object is viewed through the whole set of cells.

39. Optical component configured to be used to produce a transparent optical element selected from ophthalmic lenses, contact lenses, and eye implants, the optical component comprising
- at least one set of transparent cells juxtaposed parallel to a surface of the component and
- at least one absorbing coating, placed adjoining the walls on one side extending parallel to said component surface, the absorbing coating having at least one wavelength absorption band of between 400 nm and 700 nm, each cell being hermetically sealed and containing a substance having an optical property, all the cells being separated by walls, the optical component configured so that a single image of an object is obtained when the object is viewed through the whole set of cells.

* * * * *